United States Patent
Sonoda

[19]

[11] Patent Number: 5,948,025
[45] Date of Patent: Sep. 7, 1999

[54] VEHICLE COMMUNICATION CONTROL APPARATUS

[75] Inventor: Toshiyuki Sonoda, Nagoya, Japan

[73] Assignees: Harness System Technologies Research, Ltd.; Sumitomo Wiring Systems, Ltd.; Sumitomo Electric Industries, Ltd., all of, Japan

[21] Appl. No.: 08/893,948

[22] Filed: Jul. 16, 1997

[51] Int. Cl.[6] ................................................. G06F 13/14
[52] U.S. Cl. ........................ 701/29; 701/34; 340/825.06
[58] Field of Search ................................. 701/29, 30, 31, 701/33, 34, 35; 340/825.06, 825.07, 825.16

[56] References Cited

U.S. PATENT DOCUMENTS 5,510,775  4/1996  Loncle .............................. 340/825.07
5,832,397  11/1998  Yoshida et al. ........................ 701/29

Primary Examiner—Tan Nguyen
Attorney, Agent, or Firm—Jordan B. Bierman; Bierman, Muserlian and Lucas

[57] ABSTRACT

A vehicle communication control apparatus serves to distribute purposes of trouble diagnosis of vehicle electronic appliances in a group of networks, thereby enhancing an efficiency of trouble diagnosis and reducing a time required for the trouble diagnosis. A plurality of groups of networks to each of which vehicle electronic appliances (4, 5, 6) are connected are interconnected by first, second and third vehicle communication control apparatuses (10, 20, 30). The first, second, and third apparatuses (10, 20, 30) are provided with means for diagnosing a trouble of a vehicle electronic appliance (5 or 6) in one group of networks in response to a trouble diagnosis start command from a trouble diagnosis tester (8) for another vehicle electronic appliance (4) in the other group of networks and with means for storing results of trouble diagnosis concerning each vehicle electronic appliance (5 or 6) and for transmitting the results to the trouble diagnosis tester (8) in good time. It is possible to enhance an efficiency of each network since each network operates individualy during the trouble diagnosis.

2 Claims, 5 Drawing Sheets

Fig. 2

START COMMAND OF TROUBLE DIAGNOSIS

| byte #＼bit # | 7 6 5 4 3 2 1 0 |
|---|---|
| 0 | COMMAND ATTRIBUTE |
| 1 | VEHICLE ELECTRONIC APPLAIANCE NO. |
| 2 | DATA FIELD 1 |
| 3 | DATA FIELD 2 |

Byte 0: 00h = SELF TEST / 01h = REGISTER TEST

Byte 2: 
- 00h = NO SYSTEM DESIGNATION
- 01h = SYSTEM DESIGNATION
- 00h–FFh = REGISTER ADDRESS Byte 3:
- 00h = ALL SYSTEM
- 01h–03h = EACH SYSTEM
- 00h–FFh = WRITE DATA

Fig. 3

DATA OF TROUBLE DIAGNOSIS RESULTS

| byte # \ bit # | 7 6 5 4 3 2 1 0 |
|---|---|
| 0 | DATA ATTRIBUTE |
| 1 | VEHICLE ELECTRONIC APPLAIANCE NO. |
| 2 | DATA FIELD 1 |
| 3 | DATA FIELD 2 |

Byte 0: FFh = SELF TEST RESULTS / FEh = REGISTER TEST RESULTS

Byte 2: 00h = NO ERROR / 01h–FFh = EACH ERROR CODE — 00h–FEh = REGISTER ADDRESS

Byte 3: RESERVED — 00h–FFh = READ DATA

VEHICLE COMMUNICATION CONTROL APPARATUS

BACKGROUND OF THE INVENTION

This invention relates to a vehicle communication control apparatus which is mounted on a vehicle and controls communication among electronic appliances in a vehicle (hereinafter referred to as vehicle electronic appliances) such as a navigation system unit, an ABS (antilock brake system) unit, and the like.

Heretofore, reduction in this size of wire harnesses and lightening of a weight of a vehicle have been carried out by interconnecting a plurality of vehicle electronic appliances mounted on a vehicle through multiplex communication cables to provide a vehicle with high performance. Currently, since various kinds of vehicle electronic appliances are mounted on a vehicle, vehicle electronic appliances which are integral to each other are assembled together in a group and the vehicle electronic appliances in each group are interconnected through multiplex communication cables to form a plurality of groups of networks in a vehicle. The respective groups of networks are interconnected by vehicle communication control apparatuses which serve as a so-called gateway to effect communication among the respective groups of networks.

This manner can not only speed up communication in each group of networks but also effect communication among the respective groups of networks, since the vehicle electronic appliances which are integral to each other in each group of networks are interconnected by relatively short cables and the respective groups of networks are interconnected by the vehicle communication control apparatuses.

Heretofore, in order to diagnose a trouble in vehicle electronic appliances in a group of networks, a trouble diagnosis tester is connected to the group of networks and is brought into access each vehicle electronic appliance to start a self test function of each appliance or to directly read and write a register in the appliance. Then, the trouble diagnosis tester analyzes results such as read and write of the self test or register and determines existence and position of trouble in each vehicle electronic appliance.

However, in the case where the trouble diagnosis tester changes an access from one group of networks to the other group of networks, the tester cannot effect the access to the vehicle electronic appliances in the other group of networks unless both groups of networks are in a condition for receiving a diagnostic check since a vehicle communication control apparatus merely serves as a gateway. Consequently, it takes much time to commence the trouble diagnosis.

If either group of networks operates at a lower speed, it will take great deal of time from trouble diagnosis of the vehicle electronic appliances to transmission of the diagnostic results, since both groups of networks are occupied by the trouble diagnosis tester during trouble diagnosis. Since the other group of networks which operates at a high speed is occupied by the tester in the meantime, efficiency of utilization of a group of networks in trouble diagnosis of vehicle electronic appliances will be lowered.

SUMMARY OF THE INVENTION

An object of the present invention is to provide a vehicle communication control apparatus which serves to distribute purposes of trouble diagnosis of vehicle electronic appliances in a group of networks, thereby enhancing efficiency of trouble diagnosis and reducing time required for the trouble diagnosis.

In order to achieve the above object, a vehicle communication control apparatus which interconnects a plurality of groups of networks to each of which a plurality of vehicle electronic appliances are connected, in accordance with the present invention, comprises: means for diagnosing a trouble of a vehicle electronic appliance in one group of networks in response to a trouble diagnosis start command from a trouble diagnosis tester connected to the other group of networks; and means for storing results of trouble diagnosis concerning each vehicle electronic appliance and for transmitting the results to the trouble diagnosis tester in good time.

Since the vehicle communication control apparatus of the present invention can diagnose a trouble in a vehicle electronic appliance in one group of networks in response to a trouble diagnosis start command from a trouble diagnosis tester connected to the other group of networks, the trouble diagnosis tester is not occupied by the other group of networks when diagnosing the trouble of the vehicle electronic appliance in the one group and thus the other group of networks can be utilized for another purpose. Also, since the vehicle communication control apparatus can store the results of the trouble diagnosis of the vehicle electronic appliance and transmit the results to the trouble diagnosis tester in good time, the tester can analyze the results of one group of networks after the tester has diagnosed the trouble in the other group of networks. Consequently, the other group of networks can be utilized for another purpose.

BRIEF DESCRIPTION OF THE DRAWINGS

FIG. 2 is a format diagram of a start command of trouble diagnosis;

FIG. 3 is a format diagram of data of trouble diagnosis results;

DETAILED DESCRIPTION OF THE PREFERRED EMBODIMENTS

Figure 1:
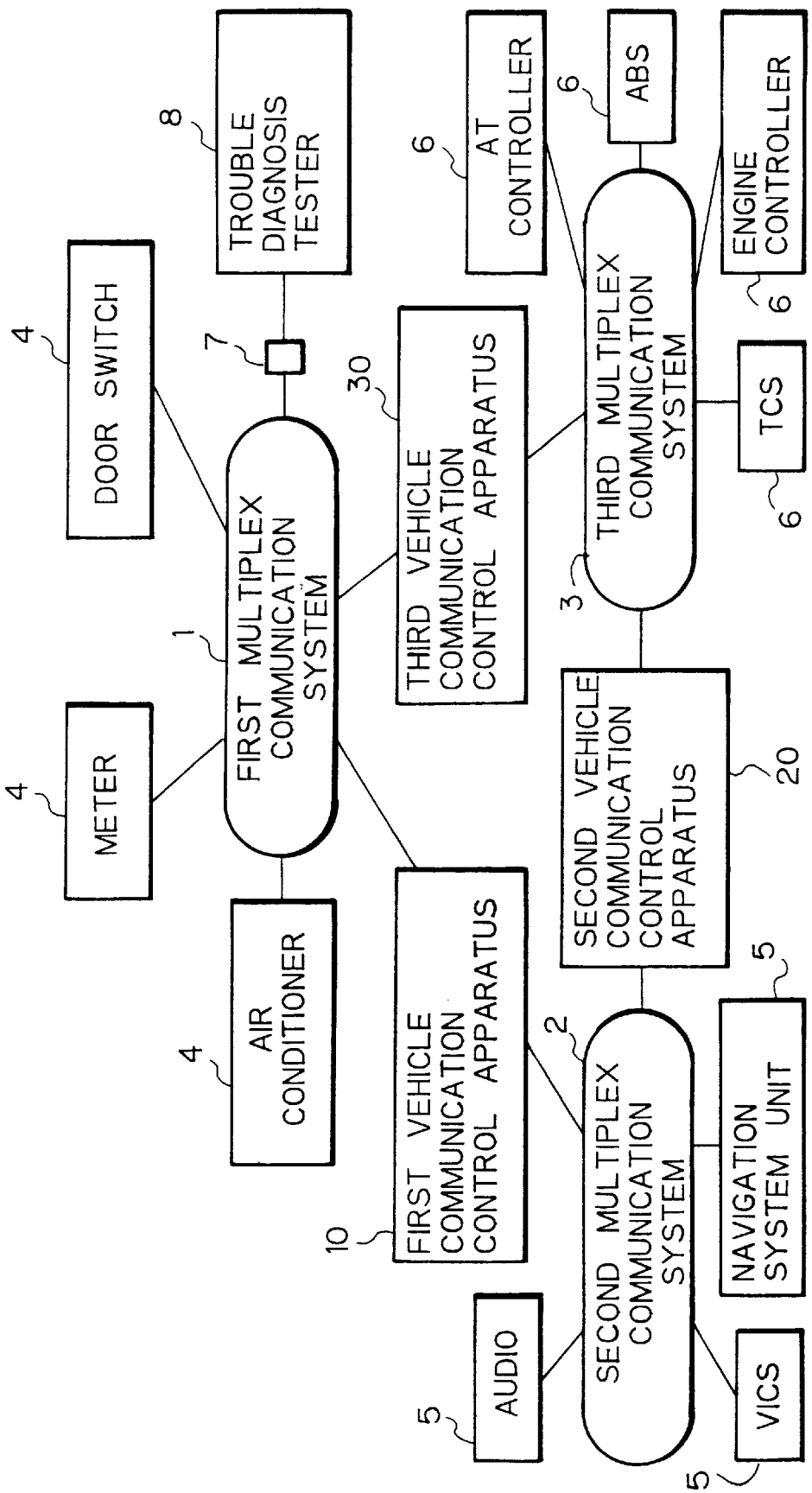
FIG. 1 is a schematic block diagram of vehicle communication networks.

Referring now to the drawings, an embodiment of a vehicle communication apparatus in accordance with the present invention will be described below.

FIG. 1 shows vehicle communication networks which interconnect vehicle electronic appliances in a vehicle. The vehicle communication networks include a first multiplex communication system 1 in a first group of networks of vehicle electronic appliances 4 for body elements, a second multiplex communication system 2 in a second group of networks of vehicle electronic appliances 5 for information processing, and a third multiplex communication system 3 in a third group of networks of vehicle electronic appliances 6 for driving control. The first, second, and third systems 1, 2, and 3 are interconnected in loop through first, second, and third vehicle communication control apparatuses 10, 20, and 30, respectively.

The first multiplex communication system 1 is connected through the first vehicle communication control apparatus 10 to the second multiplex communication system 2 and is connected through the third vehicle communication control apparatus 30 to the third multiplex communication system 3. Also, the second multiplex communication system 2 is connected through the second vehicle communication control apparatus 20 to the third multiplex communication system 3.

Each of the vehicle electronic appliances 4, 5, and 6 stores own number given in order and own system number. Each appliance has self test functions. These self test functions include a function of adding and checking at any time data from each address of a built-in ROM (Read Only Memory), a function of reading, writing, and checking given data in each address of a built-in RAM (Random Access Memory), and a function of supplying a test signal to a built-in IC (Integrated Circuit) and of checking an operation.

The first multiplex communication system 1 is provided with an external connector 7, to which a trouble diagnosis tester 8 is connected.

The trouble diagnosis tester 8 transmits a start command of trouble diagnosis having four byte lengths, as shown in FIG. 2, to the first multiplex communication system 1.

Byte #"0" of the start command of trouble diagnosis indicates a command attribute, in which 00h designates a self test and 01h designates a register test. When the self test is designated, a specified vehicle electronic appliance carries out the self test and transmits the self test results to a vehicle communication control apparatus. Also, when the register test is designated, the vehicle communication control apparatus writes given data in a register of a specified vehicle electronic appliance and transmits the data read out of the register to the trouble diagnosis tester. Byte #"1" indicates the number of a vehicle electronic appliance and specifies it.

Byte #"2" and byte #"3" of the start command of trouble diagnosis are data fields and indicate different contents in accordance with the designation of byte #"0", that is, either self test or register test.

If the self test is designated, 00h in byte #"2" indicates that there is no designation of the number of the multiplex communication system and trouble diagnosis is carried out in only the vehicle electronic appliance specified by byte #"1" while 01h in byte #"2" indicates that the designation of byte #"1" is ignored and the trouble diagnosis is carried out in all vehicle electronic appliances connected to the number of the multiplex communication system specified by byte #"3". 00h in byte #"3" designates all multiplex communication systems on the networks, that is, the multiplex communication systems 1 to 3 while 01h to 03h in byte #"3" designates each multiplex communication system.

On the other hand, if the register test is designated, byte #"2" indicates a register address of the vehicle electronic appliance specified by byte #"1" while byte #"3" indicates the data to be written in the register at the address designated by byte #"2". Accordingly, when the register test is designated, desired data can be written in any register of any vehicle electronic appliance, thereby enabling the trouble diagnosis to be effected in more detail.

When the start command of trouble diagnosis from the trouble diagnosis tester 8 is transmitted to the first multiplex system 1, the first vehicle communication control apparatus 10 stores the start command of trouble diagnosis in an internal FIFO (First-In First-Out) memory in order and analyzes the start command and carries out the trouble diagnosis of the self test or the register test for the vehicle electronic appliance of the second multiplex communication system 2 if it is designated. Similarly, if the vehicle electronic appliance of the third multiplex communication system 3 is designated, the third vehicle communication control apparatus 30 also effects the trouble diagnosis of the appliance.

The results of the trouble diagnosis are sent from the vehicle electronic appliance to the vehicle communication control apparatus as data having four byte lengths shown in FIG. 3.

In these data of the trouble diagnosis results, byte #"0" indicates a datum attribute, that is, FFh indicates the results of self test and FEh indicates the read results of register data in the register test. Byte #"1" indicates the number of the vehicle electronic appliance which was diagnosed.

Byte #"2" and byte #"3" of data of trouble diagnosis results are data fields, which are different in content in accordance with either self test or register test. In the case of indicating the results of self test, 00h in byte #"2" indicates no error and 01h to FFh in byte #"2" indicate error codes of self test. At this time, byte #"3" indicates nothing. This is a reserved byte for extension in the future. On the other hand, in the case of indicating the read results of register test, byte #"2" indicates an address of a register in the vehicle electronic appliance shown in byte #"1" and byte #"3" indicates data read out of the register.

When the first and third vehicle communication control apparatuses 10 and 30 receive the data of trouble diagnosis results from each vehicle electronic appliance, the apparatuses 10 and 30 store the received data in the internal FIFO memory in order. When the first multiplex communication system 1 becomes free, the apparatuses 10 and 30 transmit the data to the trouble diagnosis tester 8 in order. The trouble diagnosis tester 8 analyzes the received data of trouble diagnosis results and indicates a position of trouble on a display panel if there is any trouble.

Next, an actual flow of trouble diagnosis will be explained by referring to flow charts.

Figure 4:
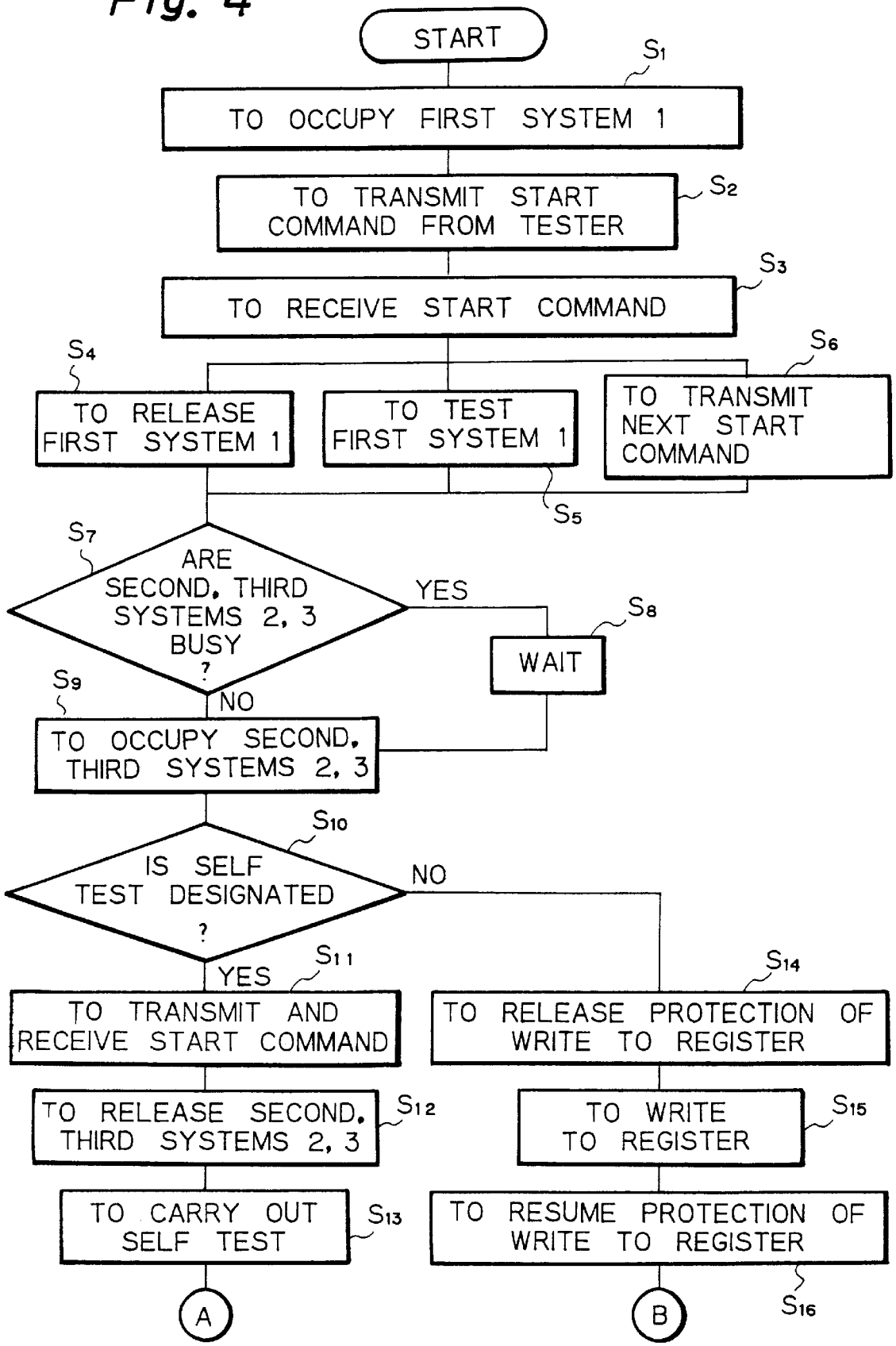
FIG. 4 is a flow chart of trouble diagnosis.

As shown in FIG. 4, the trouble diagnosis tester 8 occupies the first multiplex communication system 1 (S1) and transmits a start command of trouble diagnosis shown in FIG. 2 (S2). When the first and third vehicle communication 10 and 30 receive the transmitted start command of trouble diagnosis (S3), the trouble diagnosis tester 8 once releases the first multiplex communication system 1 (S4) so that another apparatus can be used. The tester 8 may occupy the first multiplex communication system 1 without releasing it and may either carry out trouble diagnosis of the vehicle electronic appliance 4 on the first multiplex communication system 1 (S5) or transmit a start command of next trouble diagnosis (S6).

In the case where a part or a whole of the vehicle electronic appliances 5 and 6 on the multiplex communication system in charge are designated, the first and third vehicle communication control apparatuses 10 and 30 wait until the multiplex communication system becomes free (S7, S8), then occupy the multiplex communication system (S9) and judge whether self test or register test is designated (S10).

If the self test is designated, the first and third vehicle communication control apparatuses 10 and 30 transmit the start command of trouble diagnosis stored in the FIFO memory in the same form or the processed form to the multiplex communication system in charge (S11). When the vehicle electronic appliances 5 and 6 on the multiplex communication system receive a start command of trouble diagnosis (S11), the multiplex communication system is released (S12). In the event that own number is designated or that a belonging multiplex communication system or all multiplex communication systems are designated, the vehicle electronic appliances 5 and 6 which have received the start command of trouble diagnosis perform the self test function (S13).

On the other hand, if the register test is designated, the first and third vehicle communication control apparatuses 10 and 30 have a linkage to the vehicle electronic appliances 5 and 6 designated by the start command of trouble diagnosis, release a write protect of the designated register in the vehicle electronic appliances 5 and 6 (S14), write the write data in the register (S15), and resume the write protection (S16).

Figure 5:
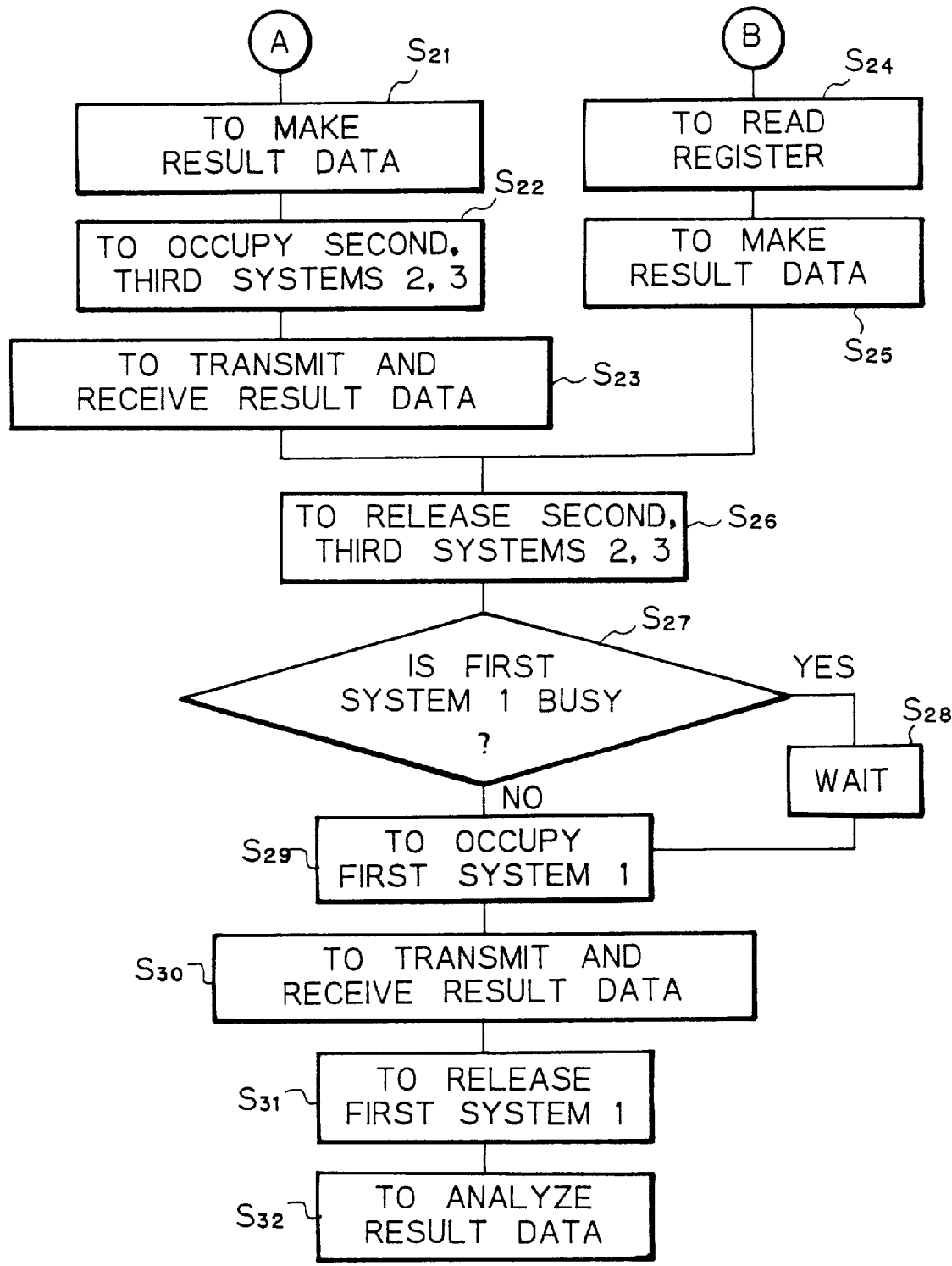
FIG. 5 is a flow chart of trouble diagnosis.

Also, the results of self test or register test are made by the steps shown in FIG. 5.

If the self test is designated, the vehicle electronic appliances 5 and 6 which have been diagnosed on trouble make data of trouble diagnosis results shown in FIG. 3 in accordance with their formats (S21), occupy the belonging multiplex communication system (S22), and transmit the data of trouble diagnosis results to the first and third vehicle communication control apparatuses 10 and 30.

The first and third vehicle communication apparatuses 10 and 30 receive the data of trouble diagnosis results and store them in the internal FIFO memory in order(S23).

On the other hand, if the register test is designated, the first and third vehicle communication control apparatuses 10 and 30 read the data written in the register (S24), make the data of trouble diagnosis results shown in FIG. 3, and store them in the internal FIFO memory in order (S25).

When one or a plurality of self test results or register test results are stored in the first and third vehicle communication control apparatuses 10 and 30, the occupied multiplex communication system is released (S26) to be utilized in another purpose.

Thereafter, the first and third vehicle communication control apparatuses 10 and 30 wait until the first multiplex communication system 1 becomes free (S27, S28), occupy the system 1 (S29), and transmit the data of trouble diagnosis results to the trouble diagnosis tester 8 (S30). When the data are received in he tester 8 (S30), the occupied first multiplex communication system 1 is released (S31).

The trouble diagnosis tester 8 analyzes the data of trouble diagnosis results and indicates the results of trouble diagnosis on the display panel.

In this embodiment, the trouble diagnosis tester 8 is connected to the first multiplex communication system 1. However, the tester 8 may be connected to the second or third multiplex communication system 2 or 3. At this time, a combination of the first or third vehicle communication control apparatus 10 or 30 and the second vehicle communication control apparatus 20 carry out the trouble diagnosis of the vehicle electronic appliances.

It will be convenient for operation and formation of a communication system in a vehicle to provide the first, second, and third vehicle communication control apparatuses 10, 20, and 30 on a central part of an instrument panel together with a car stereo set, a navigation system unit, and the like.

Since the vehicle communication control apparatus of this invention receives the start command of trouble diagnosis from the trouble diagnosis tester and diagnoses a trouble of the vehicle electronic appliances, a group of networks to be diagnosed on trouble can operate independently from another group of networks connected to the trouble diagnosis tester. Consequently, it is unnecessary to wait to transmit a start command of trouble diagnosis until both groups of networks become free and it is also possible to distribute purposes of a group of networks and enhance an efficiency of operation by utilizing another group of networks being free in another purpose or a next trouble diagnosis. Also, in the trouble diagnosis, since a high speed group of networks is not influenced from a low speed group of networks, it is possible to reduce a time required for trouble diagnosis.

What is claimed is:

1. A vehicle communication control apparatus which interconnects a plurality of groups of networks to each of which a plurality of vehicle electronic appliances are connected, comprising:

means for diagnosing a trouble of a vehicle electronic appliance in one group of networks in response to a trouble diagnosis start command from a trouble diagnosis tester connected to the other group of networks; and means for storing results of trouble diagnosis concerning each vehicle electronic appliance and for transmitting the results to said trouble diagnosis tester in good time.

2. A vehicle communication control apparatus according to claim 1, wherein said apparatus is located on a vehicle instrument panel.

\* \* \* \* \*

UNITED STATES PATENT AND TRADEMARK OFFICE
CERTIFICATE OF CORRECTION

PATENT NO. : 5,948,025
DATED      : September 7, 1999
INVENTOR(S) : T. SONODA

It is certified that error appears in the above-identified patent and that said Letters Patent is hereby corrected as shown below:

ON THE TITLE PAGE:
insert item

[30]  Foreign application priority data should read:

--July 17, 1996  [JP] Japan   187133

Signed and Sealed this

Eighth Day of August, 2000

Attest:

Q. TODD DICKINSON

Attesting Officer

Director of Patents and Trademarks